(12) United States Patent
Mantovani et al.

(10) Patent No.: US 9,945,744 B2
(45) Date of Patent: Apr. 17, 2018

(54) SAFETY SYSTEM FOR AN ELECTRIC POWER LINE FOR INTERCONNECTING A TRACTOR AND A RESPECTIVE TRAILER

(71) Applicant: IVECO S.p.A., Turin (IT)

(72) Inventors: Giorgio Mantovani, Genoa (IT); Riccardo Morselli, Spilamberto (IT)

(73) Assignee: IVECO S.p.A., Turin (IT)

( * ) Notice: Subject to any disclaimer, the term of this patent is extended or adjusted under 35 U.S.C. 154(b) by 0 days.

(21) Appl. No.: 14/642,103

(22) Filed: Mar. 9, 2015

(65) Prior Publication Data
US 2015/0251508 A1    Sep. 10, 2015

(30) Foreign Application Priority Data

Mar. 10, 2014   (IT) .............................. MI2014A0362

(51) Int. Cl.
*G01L 5/04* (2006.01)
*B60D 1/62* (2006.01)
*B60R 16/02* (2006.01)

(52) U.S. Cl.
CPC .................. *G01L 5/04* (2013.01); *B60D 1/62* (2013.01); *B60R 16/0215* (2013.01)

(58) Field of Classification Search
CPC ........ B60D 1/62; B60D 1/64; B60D 16/0207; B60R 16/0207; B60R 16/0215; G01L 5/04
USPC ....................................................... 280/422
See application file for complete search history.

(56) References Cited

U.S. PATENT DOCUMENTS

| 2,158,385 | A  | * | 5/1939  | Schwien ................. B60D 1/62 |
| | | | | 280/421 |
| 5,069,631 | A  |   | 12/1991 | Bauer et al. |
| 7,712,760 | B2 | * | 5/2010  | Ohtomo ............... B60L 3/0092 |
| | | | | 104/87 |
| 7,740,485 | B1 | * | 6/2010  | Edwards, Jr. ............ H01H 3/16 |
| | | | | 200/61.08 |
| 9,093,788 | B2 | * | 7/2015  | Lamb ................... H01R 13/633 |
| 2007/0114757 | A1 | | 5/2007 | Vickory |
| 2010/0308559 | A1 | * | 12/2010 | Tarasinski .............. A01B 59/00 |
| | | | | 280/422 |
| 2012/0306444 | A1 | * | 12/2012 | Pham ....................... H02J 7/00 |
| | | | | 320/109 |

FOREIGN PATENT DOCUMENTS

| DE | 10021232    | 10/2001 |
| DE | 10029096    | 12/2001 |
| DE | 102012214750 | 11/2013 |
| EP | 1580043     | 9/2005  |
| WO | 9965714     | 12/1999 |

OTHER PUBLICATIONS

Italian Search Report and Written Opinion for Italian Application No. ITMI20140362 dated Nov. 17, 2014.

* cited by examiner

*Primary Examiner* — Jacob D Knutson
*Assistant Examiner* — Felicia L. Brittman
(74) *Attorney, Agent, or Firm* — RMCK Law Group, PLC

(57) ABSTRACT

A safety system for an electric power line for interconnecting a tractor and a respective trailer, the safety system comprising a traction-detection element designed to identify a reciprocal departing movement between the tractor and the respective trailer, the traction-detection element being connected to means for de-energizing the electric power line when the reciprocal departing movement exceeds a predefined threshold.

13 Claims, 4 Drawing Sheets

SAFETY SYSTEM FOR AN ELECTRIC POWER LINE FOR INTERCONNECTING A TRACTOR AND A RESPECTIVE TRAILER

CROSS REFERENCE TO RELATED APPLICATIONS

The present application claims priority to Italian Patent Application No. MI2014A000362 filed Mar. 10, 2014, the entirety of which is incorporated herein by reference.

FIELD OF APPLICATION OF THE INVENTION

The present invention relates to the field of safety systems, for preventing electrocution of persons by direct or indirect contact resulting from accidental disconnection of the supply line between a tractor and a trailer.

PRIOR ART

Industrial or agricultural vehicles, road vehicles, and off-road vehicles are frequently made up of a tractor and a trailer or towed equipment, with or without wheels of its own, which must be supplied with electric current.

The trailer may be a refrigerating cell, or else, in the case of an agricultural tractor, may be any apparatus for treatment of land and/or plants.

According to the specific implementation, the supply voltage of the trailer may even be higher than 48 Vdc (or 30 Vac) and may even reach 1000 Vdc.

It is hence evident that a possible accidental disconnection of the electrical connector between the tractor and the trailer may cause accidents, in particular electrocution of persons close to the tractor and, if the connector is traversed by significant current, also burns or fires resulting from formation of an electric arc.

SUMMARY OF THE INVENTION

Consequently, the aim of the present invention is to propose a safety system for an electric power line for interconnecting a tractor and a respective trailer designed to prevent the above dangerous conditions.

The idea underlying the present invention is to provide the tractor with means for detecting reciprocal departing movement between the tractor and the trailer, de-energizing the complete electric line when a predefined threshold of tensile force exerted on a purposely designed traction-detection element is exceeded.

According to the present invention, de-energization of the electric line has repercussions on the entire electric line; this means that also the portion of electric line installed on the tractor is de-energized. Consequently, the above de-energization is certainly carried out upstream of the electrical connector that electrically interconnects the tractor and the trailer, and precisely at least between the electric generator and the electrical connector.

According to a preferred variant of the invention, de-energization is obtained by disabling the electric generator itself.

According to a first preferred variant of the invention, said traction-detection element comprises an articulated arm constrained to the tractor that can extend backwards, towards the trailer, with one end of the articulated arm connected, by means of a rope or chain, to the trailer. Set on the articulated arm is a position sensor, designed to detect exceeding of a predefined threshold of extension of the arm backwards, towards the trailer. Consequently, in the case of movement of the trailer and the tractor away from one another, the system is calibrated so as to issue a command for interruption of the electric circuit for supply of the trailer before the electrical power connector undergoes tugging and gets disconnected. The difference in length between the rope or chain and the electrical cable with the connector, which can be defined at will, determines an advance with which the command for de-energizing is issued before the connector is forced to disconnect.

Another preferred variant envisages that one end of the articulated arm is connected to the trailer by means of the same electrical cable as the one defining the aforesaid electric line. Also in this case, the system is calibrated so as to issue a command for de-energizing of the electric line for supply of the trailer before the electrical power connector gets tugged and disconnected. The difference between exceeding of a predefined threshold of extension of the arm backwards, towards the trailer, and the maximum extension possible of the arm determines the advance with which the command for de-energizing is issued before the connector is forced to disconnect.

In this case, the resistance to extension offered by the articulated arm is less than the tensile force that the electrical cable and the respective electrical connector can withstand.

In a further preferred variant of the invention said traction-detection element is constituted by the electrical cable itself, on which two consecutive bends are imposed so as to define a vertex. Said vertex is connected, by means of an elastic element, to a part of the tractor. In the event of a pull on the electrical cable, the vertex tends to move away from the part of the tractor to which it is constrained. Said movement can be detected by a position sensor that carries out interruption of the electric line. Also in this case, the restoring force of the elastic element must be less than the tensile force that the electrical cable and the respective electrical connector can withstand.

A subject of the present invention is a safety system for an electric power line for interconnecting a tractor and a respective trailer according to claim 1.

A further subject of the present invention is a tractor, equipped with self-propelling means and with an electric circuit for electrically supplying a trailer and a safety system as described above.

A further subject of the present invention is a method for putting in conditions of safe operation an electric power line for interconnecting a tractor and a respective trailer.

The claims form an integral part of the present description.

BRIEF DESCRIPTION OF THE DRAWINGS

Further purposes and advantages of the present invention will emerge clearly from the ensuing detailed description of an example of embodiment thereof (and of its variants) and from the annexed drawings, which are provided purely by way of explanatory and non-limiting example and in which.

DETAILED DESCRIPTION OF EXAMPLES OF EMBODIMENT

Figure 1:
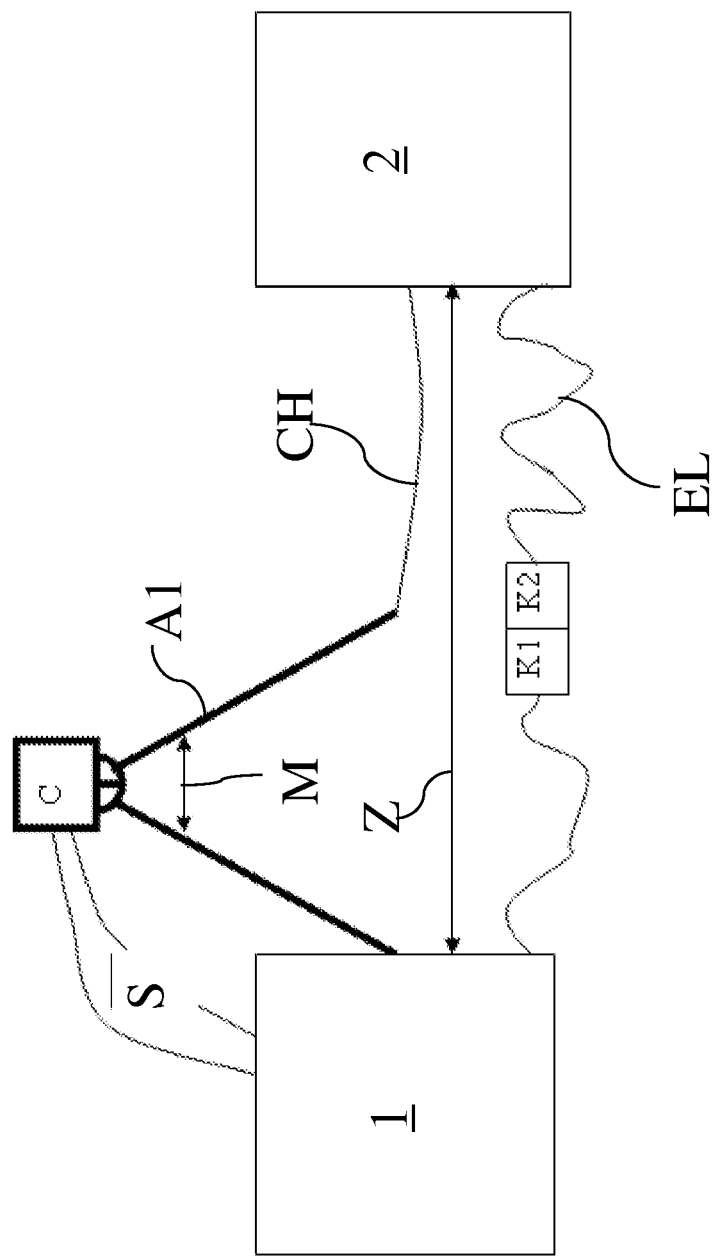
FIG. 1 is a schematic illustration of an example of embodiment of the present invention.

With reference to FIG. 1, appearing schematically therein is a side view of a tractor 1 connected to a trailer 2 for towing it by means of a connection in itself known. The direction Z represents a straight line of reciprocal departing movement between the tractor and the trailer.

The electrical cable EL enables the tractor 1 to supply the trailer 2 electrically.

Consequently, by "electrical cable" or "electric line" EL is understood comprising both the portion of line on board the tractor and the portion on board the trailer.

A connector K1, K2 enables disconnection of the above portions of the electrical cable EL.

According to a first variant of the invention, represented in FIG. 1, one of the portions of the connector, K1 or K2, can be fixed with respect to the tractor and the other with respect to the trailer.

According to the above first variant, the tractor 1 is provided with at least one oscillating arm A1 or else one articulated arm having a number of oscillating elements.

The oscillating arm hinged to the tractor can move between a resting position, retracted towards the tractor 1, and an extended position that tends to become parallel to the straight line Z of reciprocal departing movement.

For example, an angular sensor C is set in the hinge, while the free end of the oscillating arm A1 is connected by means of a rope or chain CH to the trailer 2.

Whereas the rope or chain CH is represented rather taut, the electrical cable EL is represented undulated in order to show that it has a length sufficiently greater than that of the rope or chain so that there is no tensile force on the connector K1, K2 during the first phases of extension of the oscillating arm A1.

The angular sensor is connected to a control circuit S, for example connected to a relay that is able to de-energize the electrical cable EL when the oscillating arm is extended towards the trailer 2 and thus tends to become parallel to the straight line Z of reciprocal departing movement.

The angle of extension at which the relay is activated is selected so as to de-energize the electrical cable EL before disconnection of the connector K1, K2.

Consequently, in the event of accidental disconnection of the trailer from the tractor, any persons who might enter into contact with the connector K1 connected to the tractor are safeguarded from any direct contact. Advantageously, no electric arc can arise during disconnection of the connector K1, K2, in so far as the electric line EL is already completely de-energized.

According to another preferred embodiment of the first variant of the invention, the angular sensor C is connected to a vehicle control unit (not represented) of the tractor 1 that controls the vehicle electric generator, and the control unit is designed to de-activate the electric generator itself when it receives from the sensor C an electrical signal that indicates an excessive extension of the oscillating arm A2.

Preferably, the oscillating arm rotates in a vertical plane, about the first end, naturally tending towards the retracted condition, for example dropping and hence setting itself transverse to the straight line Z of reciprocal departing movement.

Alternatively, the oscillating arm A1 is equipped with a return spring M that keeps it in a retracted position.

It should be further pointed out that the aforesaid angular sensor C can be replaced with a switch of any nature, for example an end-of-travel switch, a proximity sensor, or a contact sensor. Spring switches M are known that are able to perform both of the functions of return spring and switch.

In this case, the sensor C may be a low-power switch that drives a circuit for control of the electric line or else a power switch that itself de-energizes the complete electric line EL.

Whereas in the former case, the switch may even be monostable, in so far as one pulse would be sufficient for governing de-energization of the complete electric line EL, in the latter case, the switch must be bistable so as to guarantee de-energization of the portion of electric line EL set on the tractor also after the end of pulling of the rope/chain/electric line.

According to a further preferred variant of the invention, a release switch is provided. This keeps the arm stably in the retracted position, but, when the arm is pulled beyond a certain force, it releases the arm, at the same time de-energizing, or issuing a command for de-energization of, the complete electric line EL as a whole, and consequently also of the portion on board the tractor.

Implementation of the spring switch or of the release switch can be alternative to the angular sensor C.

A release switch is a switch that defines a mechanical hook that withholds the oscillating arm in the retracted position as long as a tensile force does not exceed a predefined threshold. Then, the switch releases the arm, and governs interruption of the complete electric line.

Figure 2:
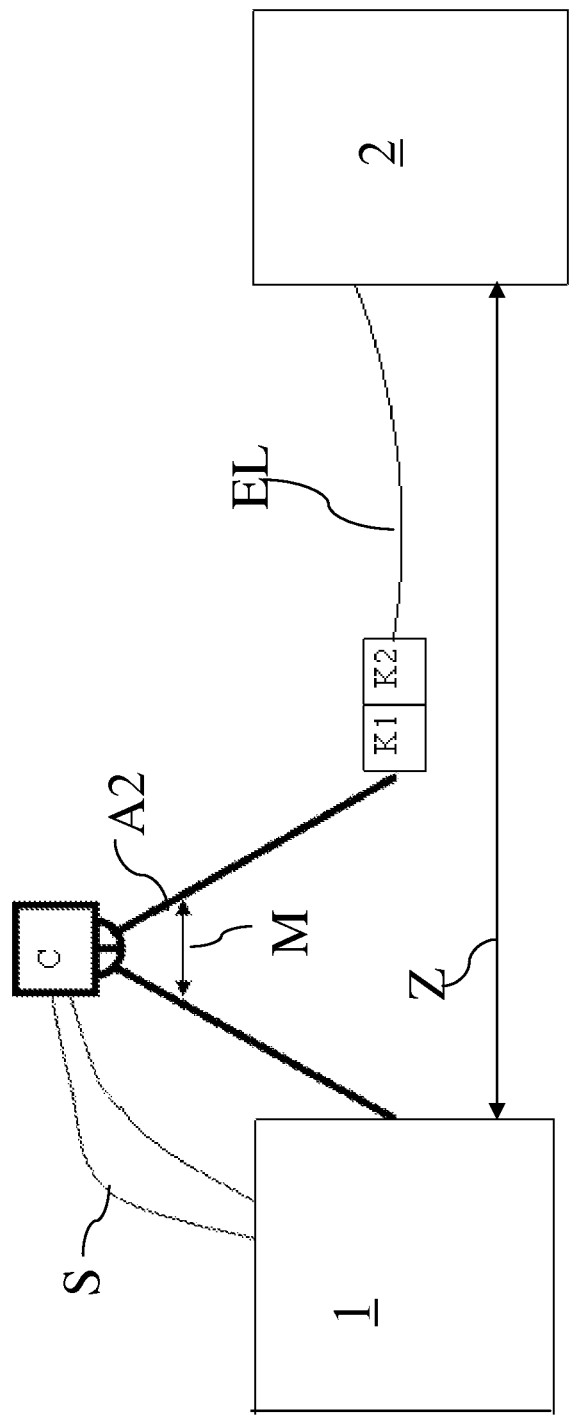
FIG. 2 is a schematic illustration of another example of embodiment of the present invention.

A second preferred variant of the invention is represented in FIG. 2 and inherits the characteristics and corresponding embodiments of the first variant of FIG. 1, except for what is described in what follows.

The oscillating arm A2 is hinged at one end to the tractor 1 and is connected at a second end to the electrical cable EL or else to the portion K1 of the electrical connector K1, K2. The chain or rope CH described above is not present. The electrical cable itself functions as traction-detection element. In FIG. 2, consequently, the portion of the electrical cable EL of the tractor may be set inside the oscillating arm A2 itself.

The resistance against extension offered by the articulated arm A2 is less than the tensile force that the electrical cable EL and respective electrical connector K1, K2 can withstand.

In this way, the oscillating arm extends backwards, towards the trailer, in the case of movement of the tractor and the trailer away from one another, before the electrical connector K1, K2 is disconnected, thus governing de-energization of the complete electrical line EL.

In FIG. 2 it may be appreciated that a portion of the electrical cable EL is incorporated in the oscillating arm itself.

Figure 3:
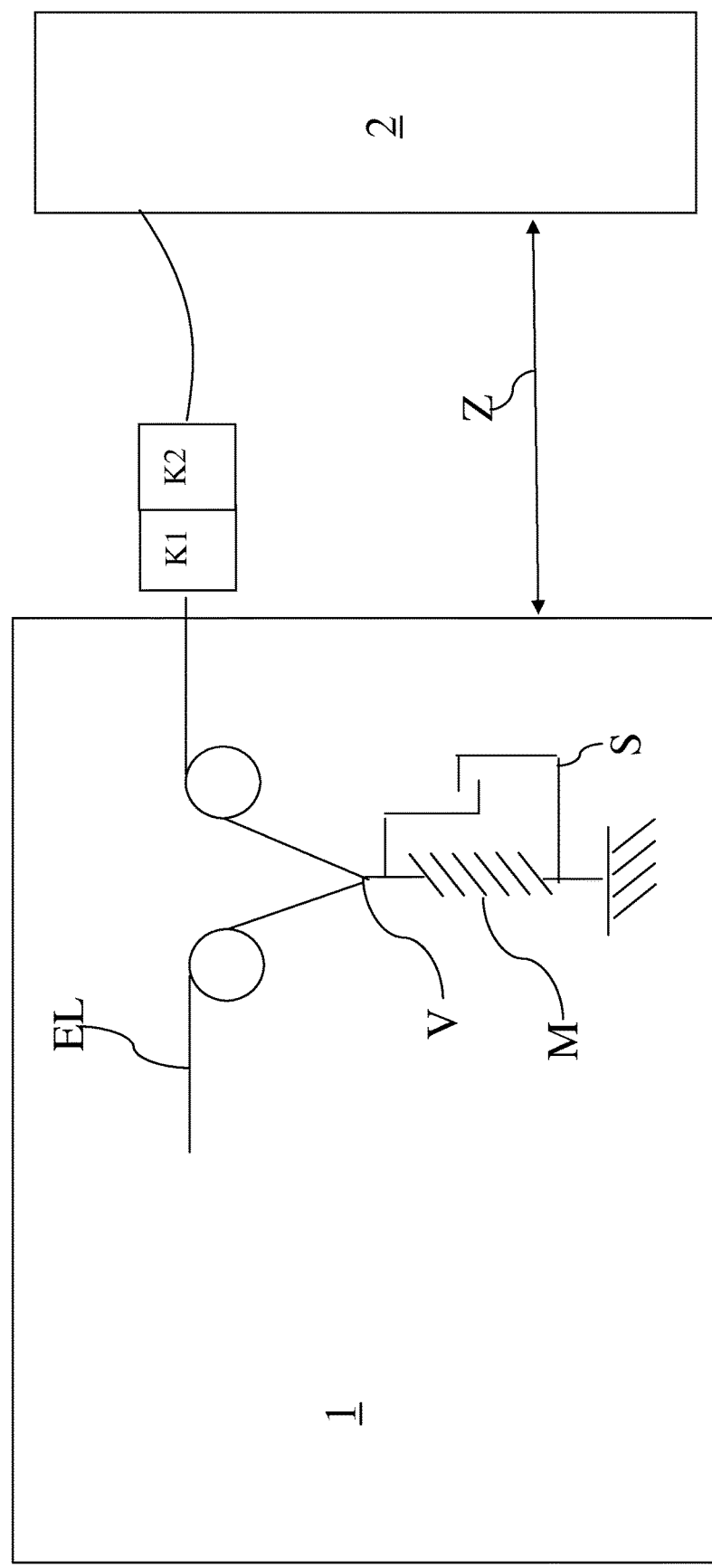
FIG. 3 is a schematic illustration of a further example of embodiment of the present invention.

A third preferred variant of the invention is described with the aid of FIG. 3.

The electrical cable is arranged so as to form three consecutive vertices in a plane, with alternating angles, positive-negative-positive, so as to define an intermediate vertex V.

This vertex is connected, by means of an elastic element M, to a fixed part of the tractor 1.

In the case where the electrical cable is pulled, the vertex tends to move away from the fixed part of the tractor to which it is constrained. This movement can be detected by means of any sensor inserted in a control circuit S, which brings about interruption of the complete electric line.

Figure 4:
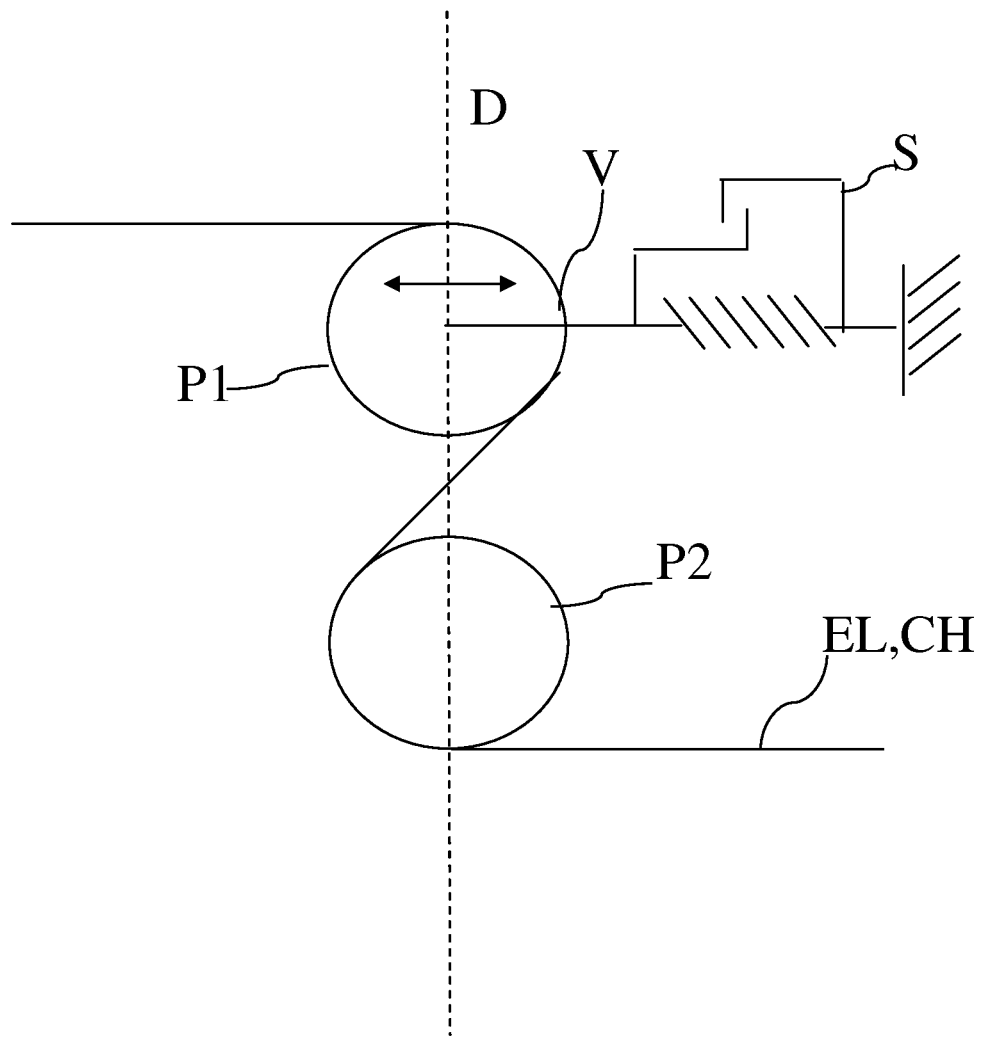
FIG. 4 is a schematic illustration of a further example of embodiment of the present invention.

A fourth variant is described in FIG. 4, in which two pulleys P1 and P2 lie in a plane defining a direction D with their respective centres of rotation.

One of the two pulleys, P1, has its own centre of rotation mobile and is held in a first position by a return spring or by a release switch as described above.

When a tensile force exceeds a predefined threshold, the centre of rotation of the pulley is induced to move, thus bringing about de-energization of the entire electric line EL.

Entire or complete electric line are synonyms.

For both of the variants of FIGS. 3 and 4 the restoring force of the elastic element M or the force of release of the release switch must be less than the tensile force that the electrical cable EL and the respective electrical connector K1, K2 can withstand.

It is evident that in the context of the present invention by "trailer" is understood any towed device or equipment, with or without wheels of its own, which must be supplied with electric current.

The present invention can advantageously be implemented via a computer program product that comprises code means for implementation of one or more steps of the method, when the program is run on a computer. Consequently, it is understood that the scope extends to said computer program product and moreover to computer-readable means that comprise a stored message, said computer-readable means comprising software-program code means for implementation of one or more steps of the method, when said program is run on a computer.

From the above description the person skilled in the branch is able to reproduce the subject of the invention without introducing further constructional details. The elements and characteristics illustrated in the various preferred embodiments may be combined together, without thereby departing from the scope of the present patent application. What has been described as regards the prior art, if not specifically excluded in the detailed description, is to be considered, in combination with the characteristics of the present invention, as forming an integral part of the present invention.

The invention claimed is:

1. A safety system for an electric power line for interconnecting a tractor and a respective trailer, the electric power line comprising a portion on board the tractor and a portion on board the trailer, the safety system comprising:
    a traction-detection element designed to identify a departing movement between said tractor and the respective trailer, the traction detection element including at least one oscillating arm to detect said departing movement, said at least one oscillating arm having a hinge, said at least one oscillating arm and said hinge being separate and independent from a connector connecting said portions of said electrical power line and from said electrical power line;
    said traction-detection element being connected with means positioned at the hinge for de-energizing completely said electric power line when a reciprocal departing movement between the tractor and the respective trailer exceeds a predefined threshold such that both the portion of the electrical power line on board the tractor and the portion of the electrical power line on board the trailer are de-energized;
    said traction-detection element being arranged such that before tension is placed on the connector and before a disconnection of both the portion of the electrical power line on board the tractor and the portion of the electrical power line on board the trailer said electric power line is already completely de-energized for preventing arc formations.

2. The system according to claim 1, wherein said at least one oscillating arm includes two opposite ends, of which a first end is hinged to the tractor and a second end is designed to be connected to the respective trailer by a rope or chain;
    the at least one oscillating arm being able to move between a retracted position and an extended position, in which it tends to become parallel to a direction of the reciprocal departing movement between the tractor and the respective trailer; and
    wherein said means for de-energizing said electric power line comprise means for detecting exceeding of a predefined extension of the at least one oscillating arm.

3. The system according to claim 2, wherein said means for detecting exceeding of the predefined extension of the at least one oscillating arm are designed to intervene before said electric power line is subjected to a tensile force.

4. The system according to claim 2, wherein said means for detecting exceeding of the predefined extension of the at least one oscillating arm comprise an angular sensor or a switch associated to the at least one oscillating arm, or else a proximity sensor, or else a mechanical sensor for detecting mechanical contact between the at least one oscillating arm and the tractor.

5. The system according to claim 4, wherein said means for de-energizing said electric power line comprise a relay in communication with and controlled by said switch or said proximity sensor or said mechanical sensor.

6. The system according to claim 2, wherein said at least one oscillating arm is hinged so as to move with at least one component of motion lying in a vertical plane, naturally dropping into said retracted position.

7. The system according to claim 2, wherein said at least one oscillating arm comprises a return spring or else a release switch for forcing the at least on oscillating arm into said retracted position and/or wherein said at least one oscillating arm comprises a return spring for forcing the at least one oscillating arm into said retracted position, with said return spring integrating a force sensor or a switch.

8. The system according to claim 1, wherein said at least one oscillating arm includes two opposite ends, of which a first end is hinged to the tractor and a second end is designed to be connected to the respective trailer through said electrical power line;
    the at least one oscillating arm being able to move between a retracted position and an extended position, in which it tends to become parallel to a straight line of the reciprocal departing movement between the tractor and the respective trailer; and
    wherein said means for de-energizing said electric power line comprise means for detecting exceeding of a predefined extension of the oscillating arm.

9. The system according to claim 8, wherein a resistance to extension offered by the oscillating arm is less than a tensile force that said electric power line and the connector can withstand.

10. The system according to claim 1, wherein said traction-detection element comprises means for inducing said electric power line to form at least two vertices, wherein at least one vertex is mobile and is connected, by an elastic element, to a fixed part of the tractor, and wherein said means for de-energizing said electric power line comprise a sensor designed to detect movement of said vertex away from said fixed part of the tractor.

11. The system according to claim 1, wherein said tractor comprises a vehicle control unit for controlling an electric generator that supplies said electric power line, and wherein said means for de-energizing said electric power line are defined by said vehicle control unit, which is connected to said means for detecting exceeding of said predefined threshold of departing movement between the tractor and the respective trailer.

12. A tractor equipped with self-propelling means and an electric power circuit for electrically supplying a trailer and the safety system according to claim 1.

13. A method for putting into the condition for safe operation an electric power line for interconnecting a tractor and a respective trailer, the electric power line comprising a portion on board the tractor and a portion on board the trailer, the method comprising:

a step of detecting, by a traction-detection element, reciprocal departing movement between said tractor and the respective trailer, the traction detection element including at least one oscillating arm to detect said departing movement, said at least one oscillating arm having a hinge, said at least one oscillating arm and said hinge being separate and independent from a connector connecting said portions of said electrical power line and from said electrical power line; and a step of completely de-energizing said electric power line when said reciprocal departing movement exceeds a predefined threshold such that both the portion of the electrical power line on board the tractor and the portion of the electrical power line on board the trailer are de-energized, said traction-detection element being arranged such that before tension is placed on the connector and before a disconnection of both the portion of the electrical power line on board the tractor and the portion of the electrical power line on board the trailer said electric power line is already completely de-energized for preventing arc formations.

* * * * *